May 3, 1949.  W. W. HANSEN ET AL  2,468,751
OBJECT DETECTING AND LOCATING SYSTEM
Filed Jan. 16, 1942  7 Sheets-Sheet 1
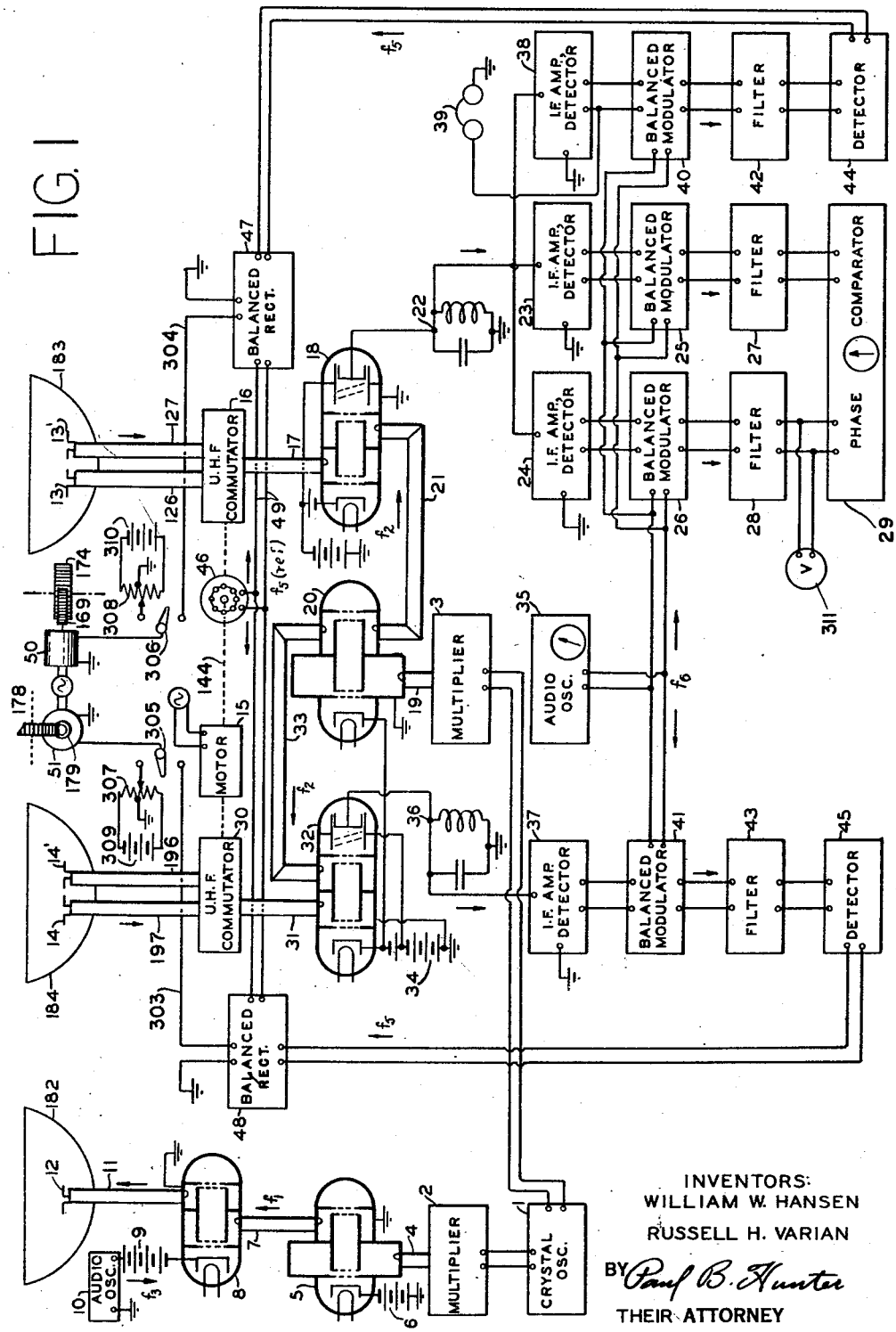
INVENTORS:
WILLIAM W. HANSEN
RUSSELL H. VARIAN
BY Paul B. Hunter
THEIR ATTORNEY

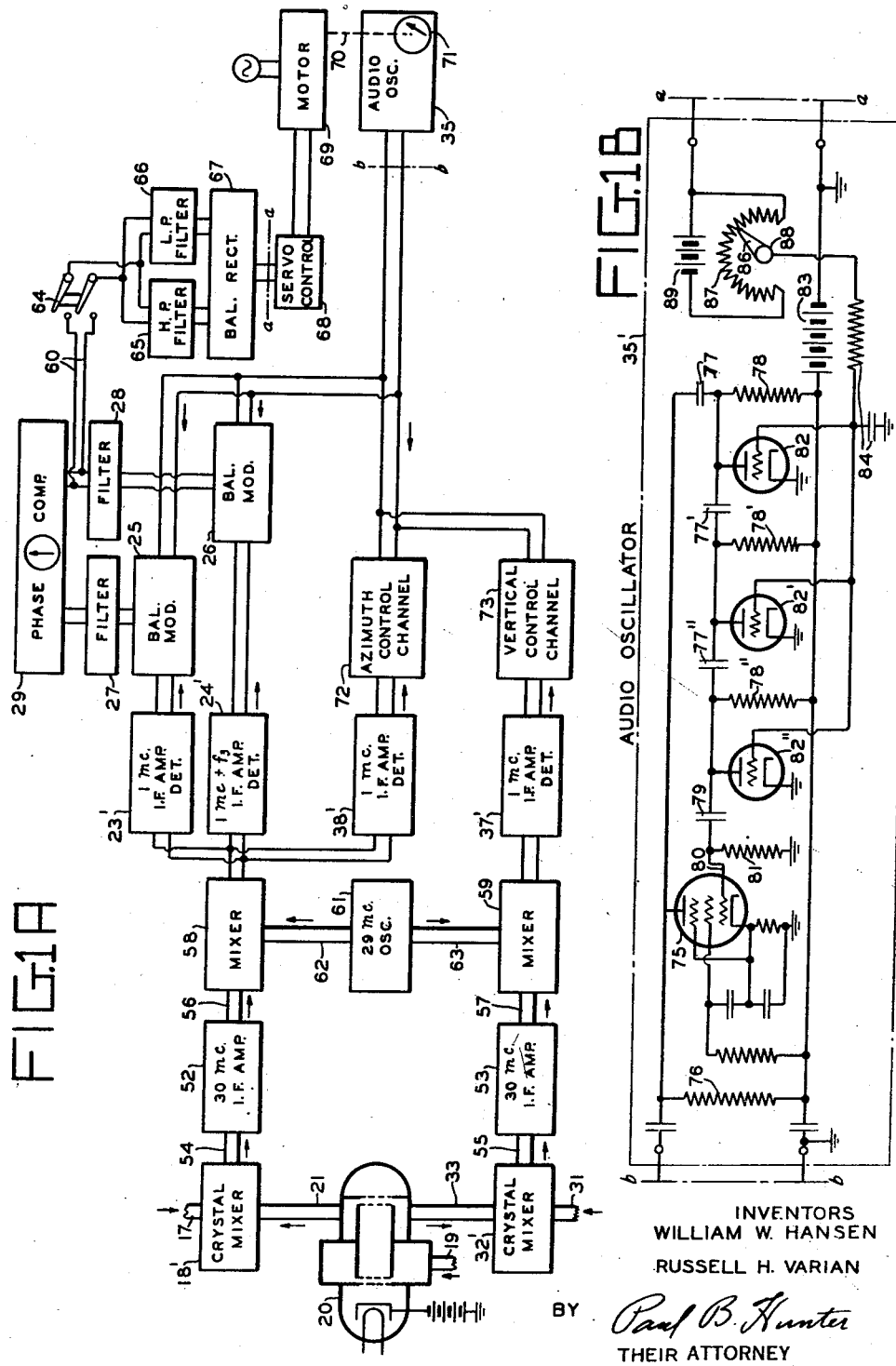

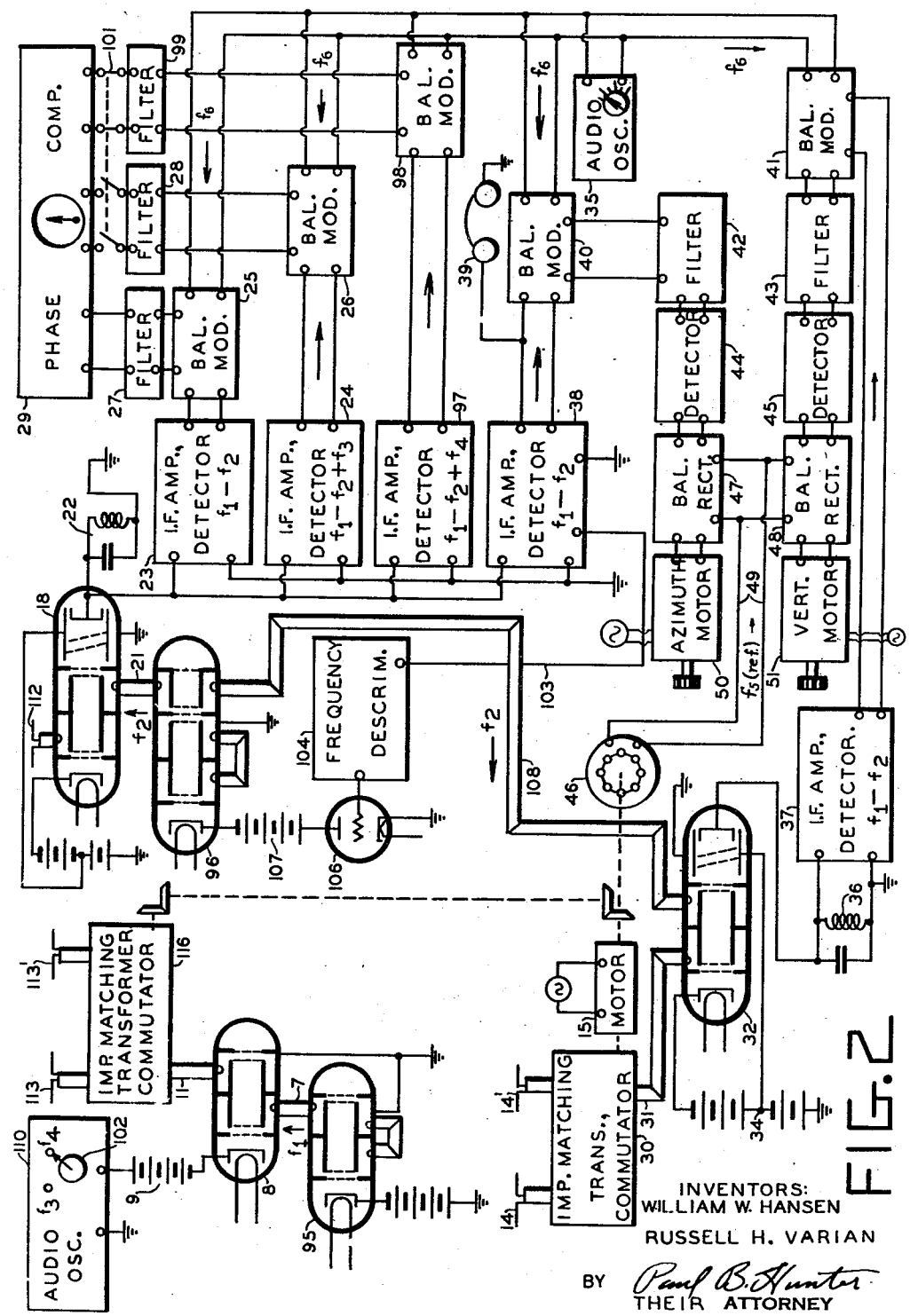

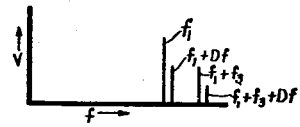
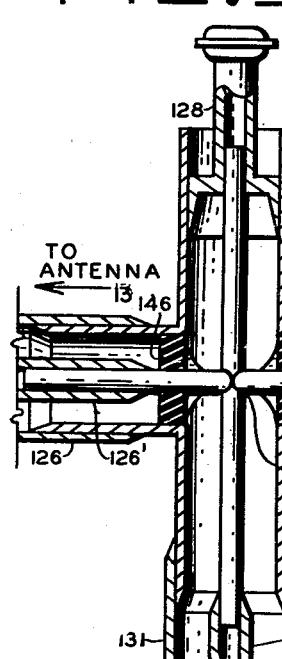
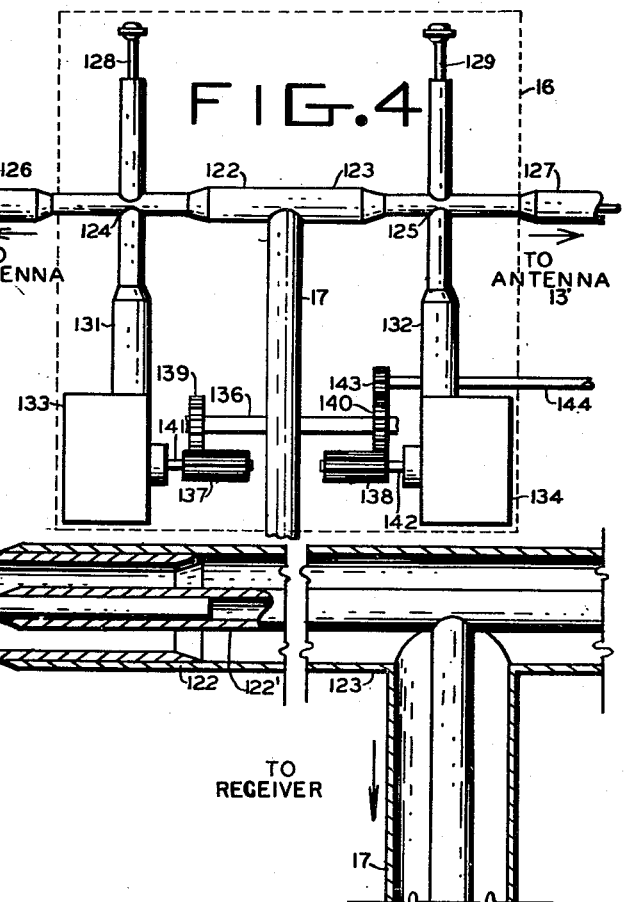
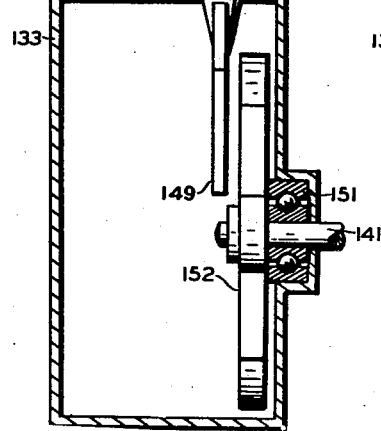
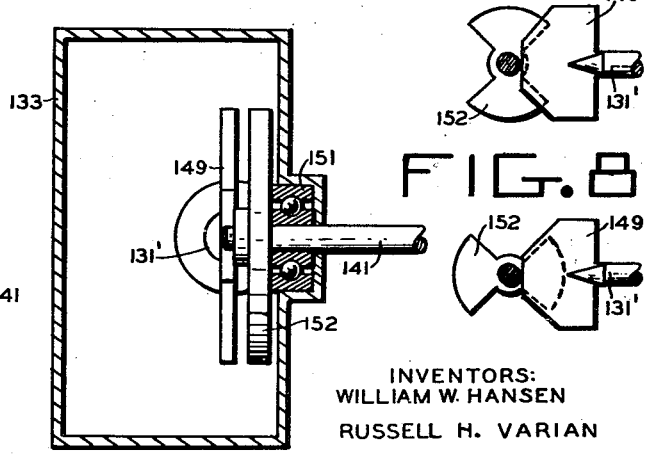

May 3, 1949.   W. W. HANSEN ET AL   2,468,751
OBJECT DETECTING AND LOCATING SYSTEM
Filed Jan. 16, 1942   7 Sheets-Sheet 5
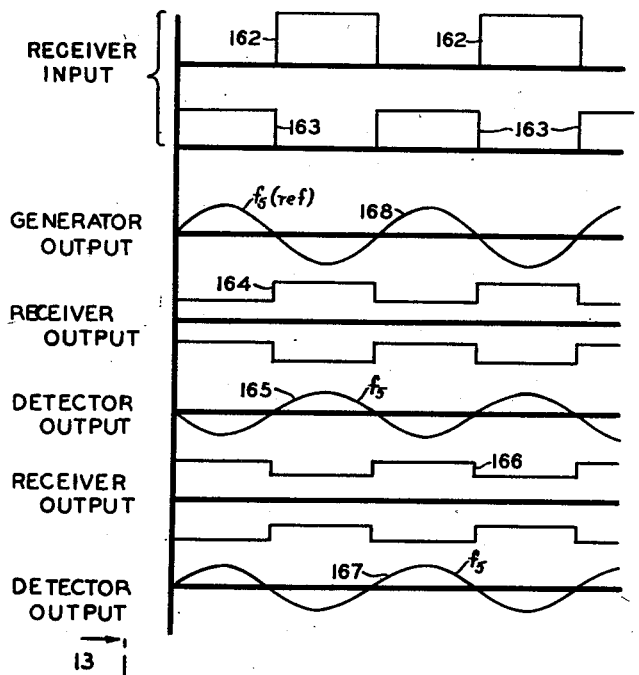
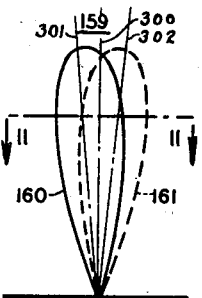
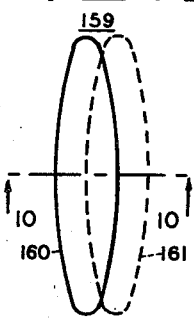
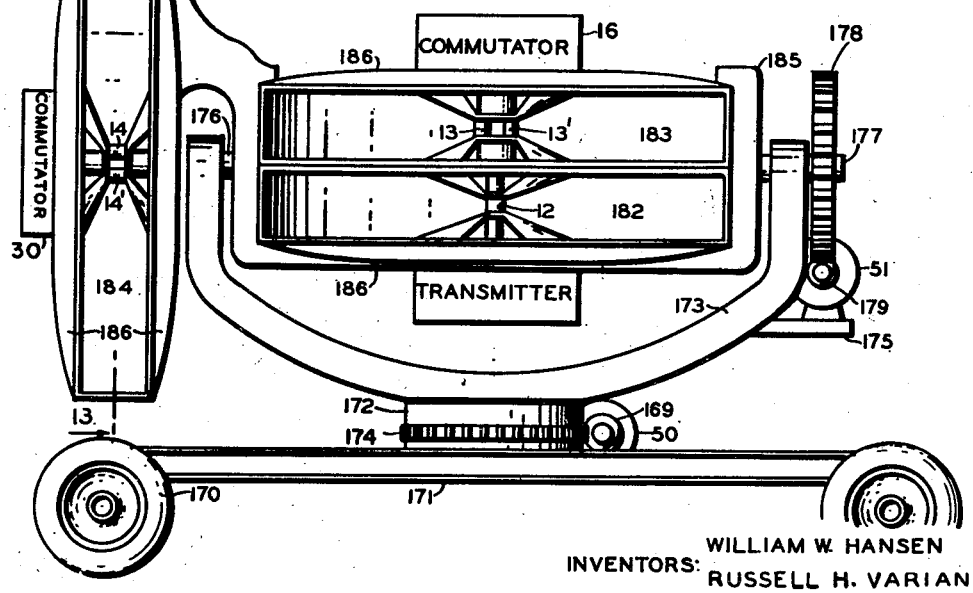
INVENTORS: WILLIAM W. HANSEN
RUSSELL H. VARIAN
BY THEIR ATTORNEY May 3, 1949.  W. W. HANSEN ET AL  2,468,751
OBJECT DETECTING AND LOCATING SYSTEM
Filed Jan. 16, 1942  7 Sheets-Sheet 6
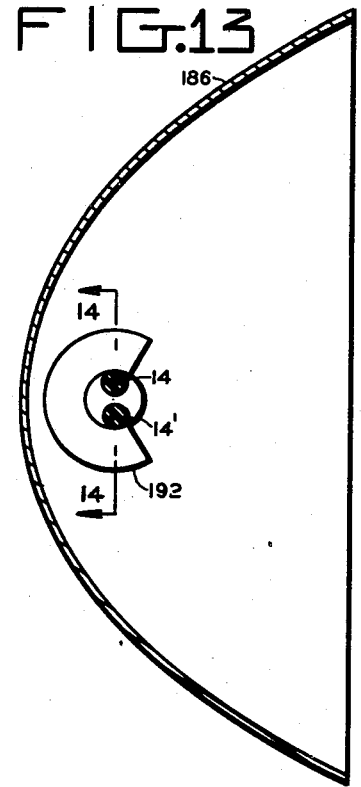
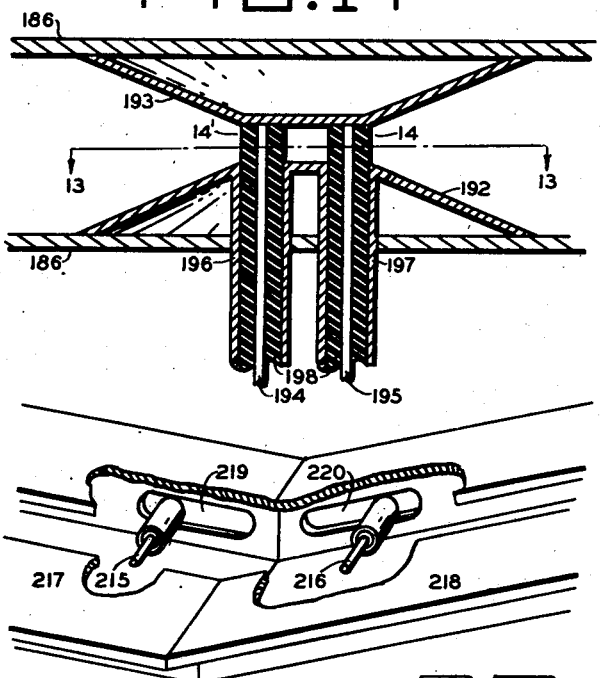
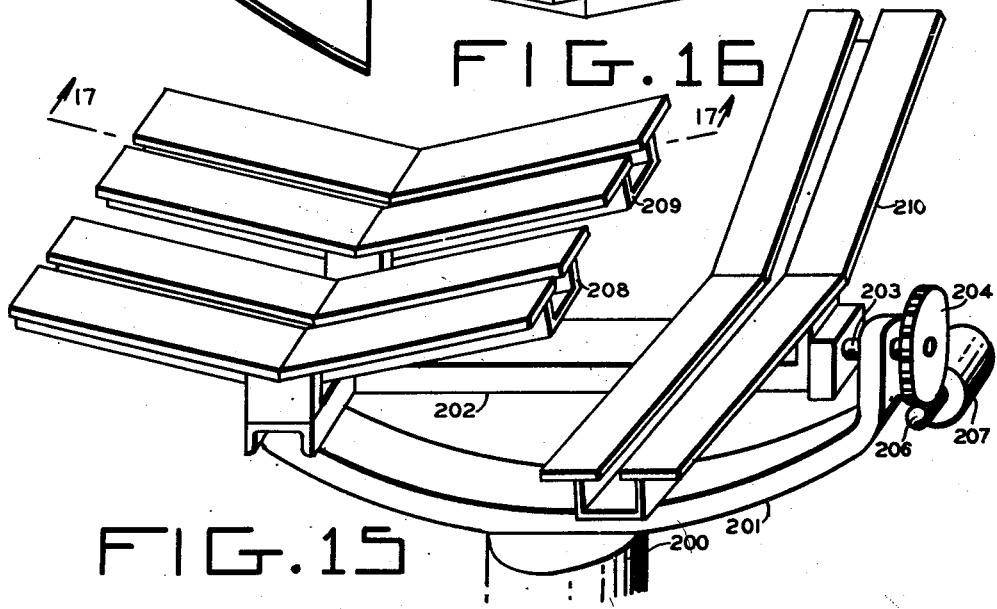
INVENTORS:
WILLIAM W. HANSEN
RUSSELL H. VARIAN
BY Paul B. Hunter
THEIR ATTORNEY May 3, 1949.  W. W. HANSEN ET AL  2,468,751
OBJECT DETECTING AND LOCATING SYSTEM
Filed Jan. 16, 1942  7 Sheets-Sheet 7
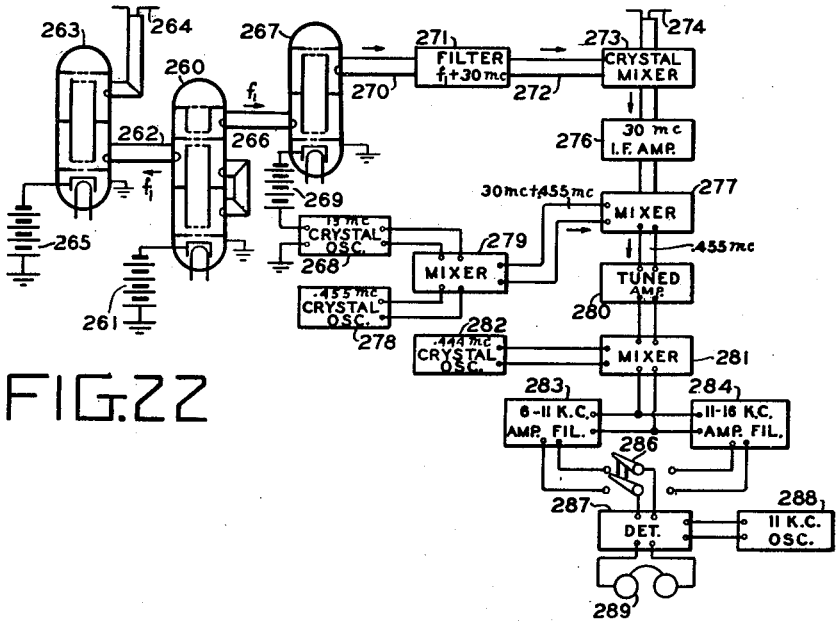
FIG. 22
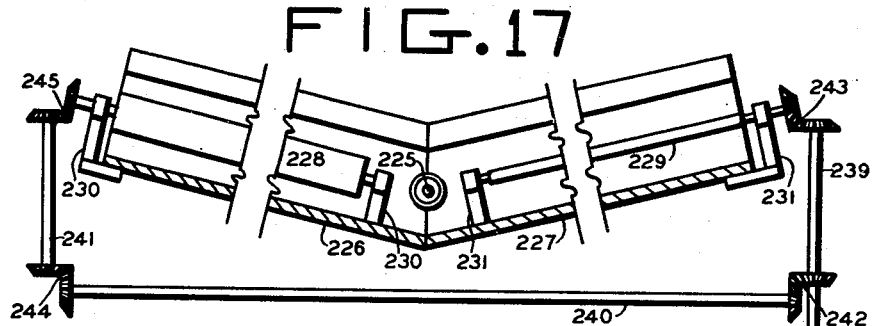
FIG. 17
FIG. 18  FIG. 19
FIG. 20  FIG. 21
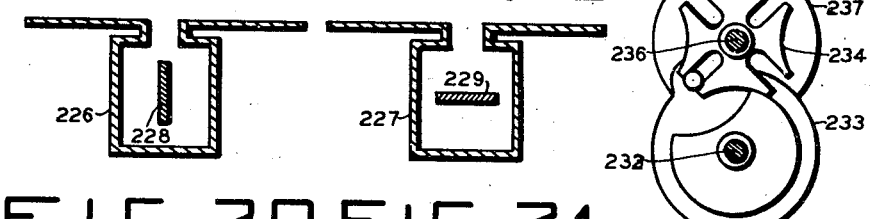
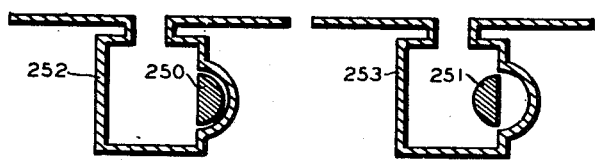
INVENTORS:
WILLIAM W. HANSEN
RUSSELL H. VARIAN
BY Paul B. Hunter
THEIR ATTORNEY Patented May 3, 1949

2,468,751

UNITED STATES PATENT OFFICE 2,468,751

OBJECT DETECTING AND LOCATING SYSTEM

William W. Hansen, Garden City, and Russell H. Varian, Bellmore, N. Y., assignors to The Sperry Corporation, a corporation of Delaware Application January 16, 1942, Serial No. 426,986

12 Claims. (Cl. 343—7)

This invention relates, generally, to the detection and location of objects such as aircraft or land vehicles and the invention has reference, more particularly, to a novel system for accomplishing this result. In co-pending application Serial No. 412,918, for Object detecting and locating system, filed September 30, 1941, in the names of William W. Hansen, Russell H. Varian and John R. Woodyard, now Patent No. 2,435,615, granted February 10, 1948, there is disclosed a system for determining the azimuth, elevation, radial velocity, and radial distance of an object relative to the detecting and locating device.

The present invention accomplishes these same results by different means and provides, in addition, means and methods for continuously and automatically centering the device on the target or other object. It is understood that the novel means and methods here disclosed may be utilized by one skilled in the art in conjunction with the aforementioned application to modify or broaden the scope of the previous system.

The basic principles underlying the continuous wave locating system employed in this invention are treated at length in the cited co-pending application Serial No. 412,918, now Patent No. 2,435,615, granted February 10, 1948. The presence of an object in the path of electromagnetic radiation will cause scattering or reflection of a portion of this radiation. Some of the scattered or reflected energy will be directed back towards the source of radiation. If the object has a component of velocity relative to the power source, the returned energy will be shifted in frequency by the Doppler phenomenon. Since the frequency shift is directly proportional to the radial velocity, the audio frequency produced by mixing the transmitted and received frequencies in a detector located at the radiation source will be a measure of this velocity. The magnitude of this shift in frequency, given a carrier frequency of the order of $3 \times 10^9$ cycles per second, is about 10 cycles per second for each mile per hour of relative velocity along line of sight.

If an object should start from the source and move away, each time the object progressed one-half a transmitted wavelength, the audio beat note or Doppler-shift frequency in the detector would pass through one cycle. Suppose there are transmitted two slightly different frequencies whose reflections are independently received. Then the audio beat notes in the separate detectors will differ in frequency in the same proportion as the high frequencies from which they were derived. In the present invention, the transmitted frequencies differ so little that the frequency difference between their Doppler-shift beat notes amounts to only a fractional cycle for each beat. This is equivalent to a slowly changing phase shift taking place between the two Doppler-shift frequencies as the object recedes, and this phase difference is a measure of the distance to the scattering object. At a certain distance the phase shift will be one cycle, beyond which point the phase readings will repeat. This maximum unambiguous distance can be changed by adjusting the frequency difference or eliminated by transmitting additional frequency differences including the useful range of the system.

One of the objects of the present invention is to provide a target or object detecting and locating system wherein the means providing the positional data of the target or object are continuously and automatically directed at the latter.

Another object of the present invention is to provide a system of the above character wherein, in operation, overlapping oscillating directive beams are adapted to enclose the object within the region defined between the central axis of the respective beams, passing through the respective radiation maxima thereof.

Another object of the present invention is to provide an object detecting system including directive radiator means adapted to project electromagnetic radiation of a plurality of frequencies and including receiver means having partially overlapping lobes of reception, said system including servo means for orientating said radiator and receiver means to maintain the detected object substantially on the bisector of the angle extending between the axes of said lobes of reception.

Still another object of the present invention is to provide a system of the above character having transmitter and connected radiator means wherein impedance matching and commutating devices are employed in the line connection between the transmitter and the radiator means for alternately producing overlapping beams of electromagnetic radiation, said commutating devices comprising continuously variable capacity means effectively varying the line impedance.

A further object of the present invention is to provide a system of the above character wherein impedance matching and commutating devices are employed on concentric line means to permit energy to flow alternately from mutually adjacent antennae whose receptive spatial patterns are displaced slightly relative to each other resulting in shifting receptive spatial patterns oscillating at the frequency of commutation.

A still further object of this invention is to provide radiating or receiving wave-guides together with control means adapted to vary the phase velocity of the electromagnetic waves within said wave-guides at will.

Another object of the present invention is to provide radiating or receiving wave guides whose directional patterns are shifted by alternately energizing a pair of antennae symmetrically located in the wave guide branches on either side of the common junction of said branches.

Yet another object of the present invention is to suppress in the receiver the leakage carrier from the transmitter in order to increase the output of the final detector and reduce the audio amplification requirements.

A further object is to provide a cylindrical parabolic reflector with a pair of antennae located on either side of the focus thereof and means to increase the interchange of energy between the antennae and the reflector so that substantially all the energy is directed by the reflector whose radiation pattern is shifted by alternately energizing said antennae.

Still another object of this invention is to provide a system of the above character wherein the frequencies received by intermediate frequency amplifier means are substantially independent of the variation of transmitted carrier frequency but are determined by crystal controlled oscillators of the same order of magnitude as the frequencies impressed upon said intermediate frequency amplifiers.

A still further object of the present invention is the provision of a continuous monitoring of the received Doppler-shift frequency and automatic follow-up by electromechanical means whereby a narrow band filter may be employed to discriminate against noise.

Another object is the provision of an electronic follow-up means to be utilized for the preceding object.

Other objects and advantages will become apparent from the specification, taken in connection with the accompanying drawings wherein the invention is embodied in concrete form.

In the drawings,

Fig. 1 is a block diagram of one embodiment of the present invention.

Fig. 1A is a block diagram of a modified portion of Fig. 1.

Fig. 1B is a schematic diagram of a modified portion of Fig. 1A.

Fig. 2 is a block diagram of another embodiment of the present invention.

Fig. 3 is a graph illustrating frequencies associated with the operation of Fig. 1.

Fig. 4 illustrates an impedance matching transformer and commutator.

Figs. 5 and 6 show parts of Fig. 4 in detail.

Figs. 7 and 8 are sketches illustrating the operation of Fig. 4.

Fig. 9 shows oscillograms of wave shapes illustrating the operation of the present invention.

Fig. 10 is an idealized elevation view of the shifting fan beam employed in the present invention.

Fig. 11 is an idealized sectional view of the beam of Fig. 10.

Fig. 12 is an elevation view of directional radiators and antennae employed in the present invention.

Fig. 13 is a sectional view of a part of Fig. 12.

Fig. 14 is a sectional view of a part of Fig. 13.

Fig. 15 is an oblique view of directive wave guides employed in the present invention.

Fig. 16 is a view of a part of Fig. 15 with the wave guide broken away to reveal antennae inside.

Fig. 17 is a sectional view of a part of Fig. 15 in greater detail showing phase velocity modulating rods.

Figs. 18 and 19 are sectional views of one form of wave guide phase velocity modulating rods.

Figs. 20 and 21 are sectional views of another form of wave guide phase velocity modulating rods.

Fig. 22 is a block diagram of another embodiment of the present invention.

Similar characters of reference are used in all of the above figures to indicate corresponding parts.

Referring now to Fig. 1, there is illustrated in a block diagram one form of apparatus for measuring the distance and radial velocity of remote objects and for automatically maintaining the device pointed thereat. A crystal controlled oscillator 1 supplies a radio frequency to a multiplier 2. The multiplier 2 raises the oscillator frequency to an ultra high frequency which is led through a coaxial lead 4 to the first hollow resonator of a final multiplier 5 whose electron beam is accelerated by a battery 6. This tube is shown as a velocity modulated electron beam device of the type disclosed in U. S. Patent No. 2,242,275, for Electrical translating system and method, issued may 20, 1941, in the name of Russell H. Varian. The present specification is not, however, limited to the above type, but the multiplier 5 and other tubes similarly represented may have any suitable substitutes. The second resonator of multiplier 5, tuned to a frequency $f_1$, of the order $3 \times 10^9$ cycles per second, feeds its output through a concentric line 7 to a power amplifier 8. This power amplifier is modulated with a frequency $f_3$, of the order of, perhaps, $10^4$ cycles per second, by means of an audio oscillator 10 in series with the beam accelerating voltage of a battery 9. The output of the power amplifier 8 is supplied to a radiator 12 through a concentric line 11. The radiator 12, placed at the focus of a cylindrical parabolic reflector 182, as shown in Fig. 12, forms a spatial radiation pattern that is substantially fanshaped, being sharply directive in azimuth and broadly directive in elevation. This radiator may alternatively be any type capable of producing a suitable directive beam, such as the device disclosed in Fig. 10 of the co-pending application Serial No. 344,633 for Radiating electromagnetic wave guides and resonators, filed July 10, 1940, in the name of William W. Hansen, one of the present inventors.

A wave guide radiator of this type is shown in Fig. 15 of the present specification where element 208 corresponds to radiator 12.

Of the frequency components issuing from radiator 12, the carrier frequency $f_1$ and a sideband $f_1 + f_3$ are useful to the system. A portion of this energy leaks directly or by ground scattering to receiving devices 13, 13,' 14, and 14'. Also, weak components due to reflection from an object or target having relative motion with respect to the equipment of this invention will be received having the same frequencies shifted slightly by the Doppler effect due to this relative motion. Therefore, useful radiation components $f_1$, $f_1 + Df$, $f_1 + f_3$, and $f_1 + f_3 + Df$ impinge on receiving devices 13, 13'' and 14, and 14'. Here $Df$ represents the Doppler-shift frequency, the sign being chosen positive for an approaching object. These frequencies are illustrated in Fig. 3.

In this figure the approximate relative amplitudes are represented vertically, and the approximate relative positions are located on a horizontal frequency scale. From left to right increasing in frequency are, first the leakage carrier $f_1$, next the reflected Doppler-shift carrier $f_1+Df$, then the leakage upper sideband $f_1+f_3$, and finally the reflected Doppler-shifted upper sideband $f_1+f_3+Df$.

Receiving antennae 13 and 13', placed on either side of the focus of a cylindrical parabolic reflector 183, as shown in Fig. 12, form partially overlapping receptive spatial patterns that are substantially fan-shaped. Each of these patterns is similar to the radiation pattern from transmitting antenna 12, being sharply directive in azimuth and broadly directive in elevation. The axes of symmetry of the principal receptive lobes are equi-angularly displaced to either side of the azimuth axis of the locating system so that the gain characteristics of the antennae 13 and 13' are equal along this azimuth axis. Fig. 10 and Fig. 11 illustrate diagrammatically these partially overlapping spatial patterns. Principal lobe 160, having an axis of symmetry 301, is associated with, say, antenna 13, and lobe 161, having an axis 302, is the gain characteristic of antenna 13'. A line 300 represents the azimuth axis of the locating system, and it will be seen to correspond to an equi-signal path.

Receiving devices 13 and 13' feed the incoming energy through concentric lines 126 and 127, respectively, to suitable energy control means shown as having the form of an ultra high frequency commutator 16. Commutator 16, driven by the shaft 144 of a motor 15, alternately connects lines 126 and 127 to an output line 17, switching inputs at a low audio frequency $f_5$. This commutator may be a conventional device which makes and breaks contacts mechanically, but it is preferably similar to the novel switching means illustrated in Figs. 4–8. This latter device, utilizing the impedance transforming properties of quarter wavelength lines, causes the output impedances of coaxial lines 126 and 127 to alternate between low and substantially infinite values. This is accomplished by connecting quarter wavelength lines to the coaxial cables 126 and 127, respectively, these coupling lines being terminated at their free ends by variable impedances rotated by the motor 15. Constructional details and alignment procedure are disclosed when Figs. 4–8 are discussed in particular.

The frequencies thus commutated are supplied through the coaxial line 17 to the first resonator of mixer 18. This mixer may be electronic, as shown, or a crystal mixer may be used, if desired.

The crystal controlled oscillator 1, besides controlling the transmitted frequency, also supplies its radio frequency to a multiplier 3 where it is raised to an ultra high frequency. The output of multiplier 3 is fed by a concentric line 19 to the large resonator of a final multiplier 20. The second resonator of the multiplier 20 is tuned to a frequency $f_2$, spaced a convenient intermediate frequency from $f_1$. This frequency difference is obtained by adjusting the ratio of the multiplication factors of multipliers 2 and 3. Coaxial line 21 interconnects the second resonators of multiplier 20 and mixer 18.

In the detector circuit of the mixer 18, the local oscillator frequency $f_2$ heterodynes with the useful received frequencies, $f_1$, $f_1+Df$, $f_1+f_3$, and $f_1+f_3+Df$ to produce $f_1-f_2$, $f_1-f_2+f_3$, and their associated Doppler frequencies. Selective intermediate frequency amplifiers and detectors 23 and 24 are coupled to a load 22 of the mixer 18 and are employed to amplify the Doppler frequency bands centering on the frequencies $f_1-f_2$ and $f_1-f_2+f_3$, respectively. In the associated detector circuit of unit 23, $f_1-f_2$ and $f_1-f_2+Df$ beat together as also do $f_1-f_2+f_3$ and $f_1-f_2+f_3+Df$ in detector 24 to create the Doppler-shift frequency $Df$. These $Df$ voltages have a changing phase relation because of the difference between the ultra high frequencies from which they are derived, as explained above and at greater length in the previously mentioned co-pending application Serial No. 412,918, now Patent No. 2,435,615, granted February 10, 1948.

The $Df$ voltages of detectors 23 and 24 are fed to push-pull inputs of balanced modulators 25 and 26, respectively. These modulators have a variable frequency $f_6$ supplied by an audio oscillator 35 to their parallel inputs. The push-pull outputs of these same modulators 25 and 26 connect to filters 27 and 28, respectively, suppressing the frequency $f_6$ in a manner familiar to those skilled in the art. The audio oscillator 35 is manually, as shown in Fig. 1 for simplicity, or automatically, as in Fig. 1A, controlled to produce a major modulation product of substantially constant frequency suitable for passing through the narrow band filters 27 and 28. Thus, issuing from filters 27 and 28 are separate voltages of the same substantially constant frequency whose respective phases are changing proportionally with the phase of the $Df$ or Doppler-shift voltages from the detectors 23 and 24, respectively.

A phase comparator 29 which may be similar to the type disclosed in co-pending application Serial No. 375,373, for Phase angle indicator, filed January 22, 1941, in the name of James E. Shepherd, now Patent No. 2,370,692, granted March 6, 1945, is connected to compare the phase of the voltage outputs of filters 27 and 28. This phase meter 29 may be calibrated in terms of radial distance, and the audio oscillator 35, since its frequency $f_6$ is a function of $Df$, may be calibrated in terms of radial velocity of the target with reference to the locating system. Since the frequency range of the Doppler-shift voltages may be, say, 5000 cycles, the employment of the filters 27 and 28, passing a frequency band of only, say, 50 cycles, greatly reduces the noise power fed to the phase meter 29. This compression of the necessary band width, therefore, increases the sensitivity of the locating system.

Receiving antennae 14 and 14', placed on either side of the focus of a cylindrical parabolic reflector 184, as shown in Fig. 12, are identical with antennae 13 and 13' and reflector 183, respectively, except that the former are arranged to be sharply directive in elevation while the latter are sharply directive in azimuth. Receiving devices 14 and 14' for the vertical plane feed through lines 197 and 196, respectively, to an ultra high frequency commutator 30 similar to the device 16 and switched synchronously therewith by the motor shaft 144. The commutator 30 is connected by a coaxial line 31 to a mixer 32, similar to the mixer 18, the electron beam of the former being accelerated by a battery 34. Heterodyning frequency $f_2$ is supplied from the multiplier 20 by a concentric cable 33 to the second resonator of the mixer 32. The detected output appears across a load 36 tuned to the frequencies $f_1-f_2$ and $f_1-f_2+Df$. This load is on the input of an I. F. amplifier and detector 37 which corresponds for the vertical plane to a device 38 fed by the load 22 for the horizontal plane. A volume indicator 39 is shown on the output of detector 38.

Detectors 37 and 38 connect to balanced modulators 41 and 40, respectively. These modulators 41 and 40, similar to modulators 25 and 26, are attached to filters 43 and 42, respectively, which latter correspond to filters 27 and 28. The audio oscillator 35 of adjustable frequency $f_6$, previously mentioned, coacts with these balanced modulators 41 and 40 in the same manner as with modulators 25 and 26 above. The output of filters 43 and 42 is supplied to detectors 45 and 44, respectively, while these latter supply balanced rectifiers 48 and 47, respectively. A generator 46, driven by the commutator motor 15, produces a reference voltage $f_5$ (ref.) of substantially constant magnitude and phase which is fed by leads 49 to the rectifiers 48 and 47, respectively. The output leads 303 and 304 of rectifiers 48 and 47 connect to one side of single-pole double-throw switches 305 and 306, respectively. The other side of switches 305 and 306 attach to variable taps of center grounded potentiometers 307 and 308, respectively, across which batteries 309 and 310, respectively, impress voltages. The center blades of switches 305 and 306 connect to servo controls incorporated in motors 51 and 50, respectively. The servo controls may be polarized relays or more refined speed and direction control devices well known to the art. Motor 50 through gearing 169 and 174 is designed to turn the combined arrays 12, 13, 13', 14, and 14' and their associated reflectors around the vertical axis, as is shown in Fig. 12. Motor 51 through gearing 179 and 178 is arranged to rotate the same arrays around the horizontal axis, as is likewise shown in Fig. 12.

In operation if a target reflects more energy to one of the directive antennae than to its companion antenna, the amplitude of the signals in the receiver will be greater when the former antenna is connected by the switching device than when the latter is connected. In other words, if the radiation impinging on antennae 13 and/or 14 differs in magnitude from the energy striking their associated units 13' and/or 14', the commutated frequencies fed to the mixers 18 and/or 32 and reaching I. F. amplifiers 38 and/or 37, respectively, will be modulated at the commutation frequency $f_5$.

The production of the switching frequency $f_5$ may be better understood by reference to the idealized oscillograms of Fig. 9. In the graphs time is represented along the horizontal axis, increasing from left to right, while power or voltage is represented along the vertical axis, positive above and negative beneath the time axis. The wave shapes termed "Receiver input" illustrate the power from a pair of antennae, say 13 and 13', that jointly produce an oscillating beam such as the beam 159 of Figs. 10 and 11. The energy from the antennae is commutated by the device 16 such as that shown in Figs. 4–8. The upper graph illustrates power pulses 162 from the antenna 13, for example, that is associated with the solid-line position 160 of the beam 159, while the lower graph illustrates pulses 163 from the companion antenna 13' that forms the broken line pattern 161. The radiators are alternately energized, each being active substantially half of the time and inactive during the period of the other's activity. The square envelopes indicate abrupt commutation such as may be obtained by the use of an intermittent gear like the Geneva movement shown in Fig. 17. Sinusoidal switching may be employed for mechanical simplicity although the total radiation is reduced. The utilization of the former method causes the beam shown in Figs. 10 and 11 to jump alternately between the smooth-line position and the dashed-line position, while the latter method shifts the beam smoothly from one position to the other.

Pulses 162 from antenna 13 are larger than pulses 163 from antenna 13' indicating, in this example, that the target lies closer to the axis 301 of the spatial pattern 160 of Figs. 10 and 11 than to the axis 302 of the antenna 13'. In Fig. 9 the graph termed "Receiver output" represents the envelope 164 of the intermediate frequency waves $f_1-f_2$ and $f_1-f_2+Df$ under these conditions. Four major audio frequency components, $f_5$, $Df$, and $Df \pm f_5$ will be present in the detectors 38 and 37 when the target is on neither horizontal nor vertical equi-signal axis. Detectors 37 and 38 feed $Df$ and $Df \pm f_5$ to the balanced modulators 40 and 41, respectively. The switching frequency $f_5$ is below the cut-off frequency of the modulators and, therefore, may be neglected. The audio oscillator 35 also supplies the adjustable frequency $f_6$ to the modulators. Filters 42 and 43 select frequencies, $Df+f_6$, $Df+f_6+f_5$ and $Df+f_6-f_5$ from the modulator outputs and introduce them into detectors 44 and 45, respectively.

These detectors reproduce $f_5$, a phase-reversing varying-magnitude signal due to its functional relationship to the radiation reaching antennae 13, 13', 14, and 14'. For example, the "Detector output" wave 165 in Fig. 9 corresponds to $f_5$ in the detector 44 when the "Receiver output" envelope is 164. However, when the target is on the right side of Figs. 10 and 11 the "Receiver output" is represented by the envelope 166 and the "Detector output" wave 167 is the resulting $f_5$ in the detector 44. Wave 167 is in phase opposition to 165, illustrating the fact that $f_5$ reverses phase when the target crosses the axis of the locating system. Since this axis is identical with the equi-signal path, $f_5$, drops to zero along this line. This voltage $f_5$ is ideally suited for control purposes when the reference voltage $f_5$ (ref.) is also provided. The graph marked "Generator output" illustrates the sinusoidal voltage output $f_5$ (ref.) of the generator 46 driven simultaneously with the switching process by the motor 15. This voltage 168 may be used as a reference because it has a constant magnitude and a fixed phase.

The voltage $f_5$ is supplied from detectors 44 and 45 to balanced rectifiers 47 and 48, respectively, while $f_5$ (ref.) is brought to said rectifiers from the generator 46 by leads 49. The balanced rectifiers, well known to those skilled in the art, produce a positive or negative voltage of varying amplitude suitable for control purposes. Balanced rectifier 47 controls the azimuth motor 50, and rectifier 48 controls the elevation motor 51 when switches 306 and 305 are thrown to connect leads 304 and 303, respectively. These control voltages cause the motors 50 and 51, as illustrated in Fig. 12, to rotate the arrays 13, 13' and 14, 14', respectively, for maintaining them continuously directed at the target. When the arrays are correctly pointed, the commutated half-cycles of received radiation will be equal, the switching voltage $f_5$ will be substantially zero, and consequently the control voltages from the rectifiers 47 and 48 will also be effectively zero. With no control voltage the motors 50 and 51 will be inoperative.

In practice the motors 50 and 51 may be manually controlled by initially connecting switches 306 and 305 to variable potentiometers 308 and 307, respectively. The directive beam of radiator 12 and the directive patterns of antennae 13, 13', 14 and 14' may be made to sweep the sky in any desired manner by manipulation of these potentiometers. The presence of a target in the path of the beams produces an audio note in volume indicator 39 whereupon the audio oscillator 35 is tuned to cause a maximum indication in an output meter 311 connected across the output of filter 28. The motors 50 and 51 are then placed on automatic control by throwing switches 306 and 305 to connect leads 304 and 303, respectively, causing the arrays to follow the movements of the target as long as the audio oscillator 35 is correctly tuned. The amplitude fluctuation of the signals in the phase comparator 29 corresponding to the low frequency modulation $f_s$ may be almost completely wiped out by properly reducing the time constant of an automatic volume control incorporated in this comparator. The amplifier detector 23, balanced modulator 25, and filter 27 may be eliminated if desired, and the phase comparator 29 may be supplied from the filter 42. The duplication of units 38, 40, and 42 is for illustrative purposes only.

Fig. 1A illustrates a somewhat modified form of the system shown in Fig. 1 and employs I. F. amplifiers 23', 24' and 38', each having a fewer number of stages than those contained in I. F. amplifiers 23, 24 and 38 of Fig. 1. The structure of Fig. 1A also provides automatic control of the audio oscillator 35. For simplicity of illustration in the drawings certain parts of the system of Fig. 1A that are similar to parts of Fig. 1 have been omitted.

In Fig. 1A the coaxial line 19 also feeds an ultra high frequency to the final multiplier 20. The second resonator of this multiplier is tuned, for example, to a frequency $f_1+30$ mc. The concentric lines 21 and 33 are shown feeding the output of the multiplier 20 to crystal mixers 18' and 32', respectively, rather than to electronic mixers as shown in Fig. 1. These mixers mix the multiplier output with the energy received by the azimuthal and elevational arrays conveyed to these mixers 18' and 32' through concentric lines 17 and 31, respectively. The broad bands of frequencies about 30 mc. created in the mixers 18' and 32' are fed to amplifiers 52 and 53 by coaxial cables 54 and 55, respectively. The outputs of the amplifiers 52 and 53 are connected by lines 56 and 57 to mixers 58 and 59, respectively, which latter are also supplied a heterodyne frequency of, for example, 29 mc. from a local oscillator 61 through coaxial lines 62 and 63, respectively. Selective intermediate frequency amplifiers 23', 24', and 38', corresponding to the unprimed elements in Fig. 1 of similar reference numerals, take their respective frequency bands from the output of the mixer 58. An amplifier 37', corresponding to the device 37 in Fig. 1, is coupled to the mixer 59. As before, the amplifier detectors 38' and 37' are utilized in the azimuth and vertical control channels 72 and 73, respectively. Amplifier detectors 23' and 24' provide the voltages of Doppler-shift frequency which are used in balanced modulators 25 and 26 in cooperation with the audio oscillator 35 to produce the substantially constant frequencies that pass through the narrow band filters 27 and 28, respectively, and are then compared in the phase meter 29. In parallel with the output of the filter 28 are placed leads 60 which connect to a switch 64. To the other side of the switch 64 are connected a high-pass filter 65 and a low-pass filter 66 symmetrically tuned to each side of the narrow band filter 28. The filters 65 and 66 feed a balanced rectifier 67 whose reversing variable direct voltage output supplies a servo control 68. The servo control which may be a polarized relay or a more refined device, such as are well known in the art, directs the speed and sense of rotation of a motor 69 which turns a geared shaft 70 connected to the tuning dial 71 of the audio oscillator 35.

In a system employing this modification it is merely necessary to tune the audio oscillator 35 initially, thereupon the switch 64 may be closed, and the oscillator frequency will automatically track the Doppler-shift frequency $Df$ to produce voltages which can pass through the narrow band 27, 28 and 42, 43, which latter are embodied in azimuth control channel 72 and vertical control channel 73, respectively. The action of filters 65 and 66 with the balanced rectifier 67 is that of a conventional frequency discriminator and appears to need no further discussion.

In Fig. 1B there is illustrated an audio oscillator 35', the frequency of which is electronically controlled. This oscillator is of the general type described in an article by Ginzton and Hollingsworth entitled "Phase-shift oscillators," Proc. I.R.E., vol. 29, No. 2. The oscillator 35' may be substituted for the devices shown between the dashed lines a—a and b—b of Fig. 1A, including the servo control 68, the motor 69, the shaft 70, and the audio oscillator 35. The device 35' contains an oscillator tube 75 having a plate load resistor 76 and a phase-shifting network in the plate to grid circuit designed to feed back a voltage of the proper phase and amplitude to produce oscillation at a frequency determined by the network parameters. The network consists of three similar capacity-coupled meshes and a blocking condenser 79 for the control grid 80 with its grid resistor 81. The plate of the tube 75 couples through a condenser 77 to the parallel combination of a resistor 78 and a tube 82. This mesh couples through a condenser 77' to the parallel impedance of a resistor 78' and a tube 82' which in turn couples to a similar mesh containing a condenser 77'', a resistor 78'', and a tube 82''. The output of the final mesh flows through the blocking condenser 79 and appears across the grid resistor 81. The resistors 76 and 78, 78', and 78'' have one end connected to a source of plate potential 83 while the other end is fastened to the plates of tubes 75, 82, 82', and 82'', respectively. The cathodes of tubes 82, 82', and 82'' are grounded, but the grids are joined together and led through a resistance-capacity filter 84 to the center arm 86 of a potentiometer 87. A knob 88 controls the arm 86 and taps off a negative bias voltage impressed across the potentiometer 87 by a battery 89.

In their action the tubes 82, 82', and 82'' are equivalent to variable resistors shunting the frequency determining resistors 78, 78', and 78'', respectively, and equal in magnitude to the static plate resistances of these tubes. Since tube characteristics are a function of the operating point, the plate resistances may be adjusted over wide limits by altering the common grid bias voltage. Thus, any change in bias conditions will alter the plate resistances and modify the phase-shift networks which determine the frequency of oscillator 35'. The oscillator is initially tuned by knob 88, and thereafter a control voltage is impressed across the input leads shown cut by broken line a—a. This voltage maintains the output frequency across the output leads shown cut by broken line b—b tracking with the Doppler-shift frequency Df.

Fig. 2 illustrates in a block diagram a somewhat modified form of the system shown in Fig. 1 and is designed to eliminate the crystal controlled oscillator 1 and the multiplier chains 2 and 3 as well as to provide an expanded distance scale. An ultra high frequency oscillator 95 supplies a generated frequency $f_1$ through the concentric line 7 to the first resonator of the power amplifier 8. Amplifier 8 is modulated with a frequency $f_3$ or $f_4$ from an audio oscillator 110 placed in series with the beam accelerating voltage 9. The frequency $f_4$ may be conveniently chosen greater than $f_3$ by a factor of ten to provide a decimal subdivision of the distance scale. The modulated output of the amplifier 8 is supplied through the concentric line 11 to an impedance matching transformer and commutator 116 similar to the device 16 in Fig. 1 but now placed in the transmitting portion of the system. Radiators 113 and 113' are alternately fed by commutator 116 and produce a shifting beam directive in azimuth like that illustrated in Figs. 10 and 11.

A directive antenna 112 receives energy for the azimuth indication and feeds it directly to the first resonator of the mixer 18 of Fig. 1. The local oscillator is an ultra high frequency device 96 tuned to the frequency $f_2$. The concentric line 21 introduces $f_2$ from a buffer stage of the oscillator 96 to the second resonator of the mixer 18. The intermediate amplifiers 23 and 24 with their accompanying balanced modulator 25 and 26, audio oscillator 35, filters 27 and 28, and phase comparator 29 are unchanged from Fig. 1. A similar channel consisting of an amplifier 97, a modulator 98, and a filter 99 have been added to accommodate the new intermediate frequency band $f_1-f_2+f_4$ and $f_1-f_2+f_4+Df$ created by the modulation frequency $f_4$. A double-pole double-throw switch 101 which may be coupled with the band-change switch 102 of audio oscillator 110 connects filter 28 or 99 to the meter 29 to read either the coarse or fine distance scales, respectively.

In order to maintain the oscillator 96 at a constant frequency difference from oscillator 95, there is provided a lead 103 that transfers some voltage of intermediate frequency from the amplifier 38 to a frequency discriminator 104, a device well known in the art. The discriminator 104 produces a positive or negative voltage of varying magnitude according to the sense and number of cycles by which the oscillator 96 differs from the frequency required to maintain the intermediate frequency $f_1-f_2$ constant. This voltage controls the plate resistance of a vacuum tube 106 in series with the accelerating voltage 107 of the oscillator 96. Since the frequency of a velocity modulation oscillator is a function of its beam accelerating voltage, the oscillator 96 may be made to track the intermediate frequency although oscillator 95 may also vary.

The vertical control channel is unchanged from that in Fig. 1 except that here the heterodyning frequency $f_2$ is supplied from the local oscillator 96 through a coaxial line 108 to the mixer 32. The directive antennae 14 and 14' supply received energy to the impedance matching transformers and commutator 30 where the switching of the inputs occurs, driven by the motor 15. The commutated energy is fed from device 30 through the coaxial cable 31 to the mixer 32 where $f_2$ is supplied as mentioned above. The amplifier detectors 36 and 37 are utilized in the azimuth and vertical control channels, respectively, which channels are identical, after these units, with those shown in Fig. 1 and, consequently, need not be discussed further.

The modifications of Figs. 1A and 1B could easily be employed in the system of Fig. 2 by one skilled in the art. The modulating frequencies $f_3$ and $f_4$ may be employed simultaneously, and the phase comparator 29 may be duplicated to provide continuous readings on both distance scales.

Referring now to Fig. 4, there is shown the commutator 16 of Fig. 1. Concentric line 126 from antenna 13 connects to a line 122 through the horizontal branches of a cross-shaped adjustable coupling 124, illustrated in Fig. 5 in greater detail. In a similar way the concentric line from antenna 13' connects to a line 123 through the horizontal branches of a cross-shaped adjustable coupling 125. Lines 122 and 123 join to form the coaxial cable 17 which feeds the mixer 18 in the receiver section of Fig. 1. Vertical stubs of the couplings 124 and 125, projecting above the junction with the horizontal branches, contain adjustable shorting plugs 128 and 129, respectively. Vertical sections extending below the crossing adjustably attach to lines 131 and 132, which latter issue from shielding boxes 133 and 134, respectively. Shafts 141 and 142, having attached pinions 137 and 138, respectively, project from the shielding boxes 133 and 134, respectively. Gears 139 and 140 on a shaft 136 mesh with pinions 137 and 138, respectively. A gear 143 on the shaft 144 of the motor 15 engages the gear 140, and consequently the shafts 141 and 142 through their associated gearing are rotated synchronously with the motor 15. Coupling 124, line 131, box 133, shaft 141, and gear 137 are designed to be horizontally displaceable as a unit within a wavelength of carrier frequency $f_1$ for tuning purposes as is the combination of coupling 125, line 132, box 134, shaft 142, and gear 138. The pinions 137 and 138 have lengths adequate to allow for these displacements. The distance between the centers of devices 124 and 125 and the shielding boxes 133 and 134 respectively may also be adjusted by means of the slideable attachment between the lower arm of the devices 133 and 134 and coaxial lines 131 and 132, respectively.

Fig. 5 is a detailed sectional view of the left portion of Fig. 4 revealing the method of joining the coaxial lines and the interior arrangement of the shielding box 133. The inner conductors 122', 126', and 131' of the coaxial lines 122, 126, and 131, respectively, are hollow and of such an interior diameter as to permit the inner conductors 124' of the device 124 to slide therein. The exteriors of lines 122, 126, and 131 are likewise enlarged to allow the exterior of the device 124 to slide therein. Insulating washers 14\` a 147 support the inner conductors 124' coaxial with the exterior of device 124. An insulating washer 148 supports the inner conductor 131'. The ratio of the outside diameter of conductors 124' to the inside diameter of the exterior conductor of device 124 is made substantially equal to the ratio of the outside diameter of conductors 122', 126', and 131' to the inside diameter of their respective exterior conductors to maintain the characteristic impedances of the various sections equal. The shorting plug 128 is made with a hollow shaft to facilitate longitudinal adjustment within the upright stub of device 124. The conductor 131' projects into the shielding box 133 where a condenser plate 149 is soldered to its end. The plan view of the plate 149 is shown in Figs. 7 and 8. The other plate of the condenser may be considered the adjacent side of the shielding box 133. The coaxial line 131 and the section of device 124 below the junction, therefore, is terminated by a capacitance whose magnitude depends on the area of the plate 149 and the spacing and dielectric constant between the plate and the side of the box 133. The shaft 141, driven by the motor 15 through the gears 137, 139, shaft 136, gears 140, 143 and shaft 144 as mentioned above, rotates in ball-bearings 151 and spins a double-bladed chopper 152 between the plate 149 and side of the box 133. Device 152 is roughly similar to a light chopper used in motion picture art. Fig. 5 shows one of the blades of the chopper 152 meshed as in Fig. 8. Fig. 6 is an alternate view of the box 133 taken at right angles to the plane of Fig. 5 looking from the base of the box at the end of the conductor 131'.

The chopper 152 may be constructed of a high dielectric constant low loss non-conductor or may be made of a conductor which is insulated from the shaft 141. The effect of a non-conductor is to increase the capacity when meshed with plate 149 because the dielectric constant of the intervening space is increased. The effect of an insulated conductor is to create two condensers in series which have increased capacity due to the reduced air gaps, and the series combination is greater than the capacity in the open position. The shielding box 133 is dimensioned to be non-resonant to the transmitter frequency.

The operational alignment of the commutator 16 of Fig. 4 is simplified by utilizing the teaching of the Reciprocity Theorem which allows the substitution of an ultra high frequency oscillator in place of the mixer 18 on the end of the coaxial line 17 to provide a temporary local power source. The alignment which is undisturbed by this substitution may be performed by the following steps:

First, mesh the left-hand chopper 152 as in Fig. 8 and adjust the length of the line from the plate 149 to the center of the coupling 124 until no energy flows down the left line 126 to the radiator 13. This means there is an effective short at the center of the coupling 124.

Repeat this adjustment for the right-hand side of Fig. 4.

Next, unmesh the left-hand chopper 152 as in Fig. 7 and adjust the plug 128 in the stub of the coupling 124 until there are no standing waves in the line 122. This means there is no reflection from the center of the coupling 124 and energy may flow unimpeded to the left radiator 13.

Repeat this adjustment for the plug 129.

Then, with chopper 152 meshed and the corresponding chopper in box 134 unmeshed, adjust the combined lengths of the right branch of coupling 124 and line 122, until there are no standing waves in the "oscillator" line 17. This means that when the center of coupling 124 is effectively shorted the "oscillator" end of the line 122 is made to appear as an open circuit and there is no loss of power due to the short at the center of coupling 124.

Repeat this adjustment for the right side of Fig. 4.

Adjust the length of coaxial line 126 to the antenna 13 with the chopper 152 meshed until the line has no field present indicating that the inactive antenna 13 is absorbing no energy from space of the active antenna 13'. This means that when the center of coupling 124 is effectively shorted, the antenna end of the line 126 is made to appear as an open circuit, and there is no loss of radiated power from the energized antenna 13'.

Repeat this adjustment for the right-hand line 127.

These above steps are repeated until the alignment conditions are satisfied. The purpose of the stub line on coupling 124 is to couple a conjugate impedance to the center of coupling 124 which will compensate for the fact that the chopper 152 produces only a finite change of capacity.

Fig. 12 illustrates a possible physical arrangement of the arrays of Fig. 1. Wheels 170 support a platform 171 upon which rests a rotatable pedestal 172 bearing a yoke 173. An annular gear 174 fastened to the pedestal 172 engages a worm gear 169 on the axle of the motor 50, mentioned in reference to Fig. 1. The motor 51 of Fig. 1 is fastened to the yoke 173 by a bracket 175. The arrays of Fig. 1 are mounted as a unit between the arms of the yoke 173 on a left trunnion 176 and a right trunnion 177. The trunnion 177 passes through the yoke and serves as a shaft for a gear 178 which engages a worm gear 179 on the axle of the motor 51. The arrays of Fig. 1 consist of similar reflectors 182 and 183 placed side by side containing the transmitting radiator 12 and the receiving antennae 13 and 13', respectively, as well as the reflector 184, rotated 90° in the plane of the figure with respect to the reflectors 182 and 183, containing the receiving antennae 14 and 14'. The reflectors 182, 183, and 184, strengthened by braces 186, are held by a frame 185. The openings of the reflectors are narrow rectangles while the section at right angles to the plane of Fig. 12 is parabolic as is shown in Fig. 13. The reflectors are, therefore, highly directive in the plane of Fig. 13 and broadly directive at right angles to this plane. The antennae 14 and 14' are displaced, preferably, one-eighth wavelength to either side of the focus of the reflector 186 on the latus rectum of the parabola. The antennae 13 and 13' are similarly located. The effect is to produce directive spatial patterns whose axes of symmetry are not parallel to the principal axis of the parabola. The patterns shift as shown in Figs. 10 and 11 when first one antenna and then the other is activated by the commutator of Figs. 4–8. Truncated cones 191 and 192, shown in section by Fig. 14, facilitate the interchange of energy between the antennae 14 and 14' and the reflector 186. Segments are cut from the portions of these truncated cones that face the mouth of the reflector. The sides of these slices are bounded by planes drawn from the focus of the cylindrical parabolic reflector to its outer edges at right angles to the reflector's flat surfaces. A cylindrical arc concentric with the focus bounds the inner faces of the cut away parts. This design is to reduce direct radiation from the antennae which would spread over a wide angle and to restrict it to the reflected beam.

Fig. 14 shows two concentric lines with inner conductors 194 and 195 and outer conductors 196 and 197, respectively. A dielectric 198 may fill the space between the inner and outer conductors. The conductors 194 and 195 connect with the upper truncated conducting cone 193 while the conductors 196 and 197 unfold into the lower cone 192. In the space between the cones the conductors 194 and 195 are unshielded and, consequently, become the radiators 14' and 14, respectively. The concentric lines, similar to lines 126 and 127 in Fig. 4, may be adjusted in length at the commutator to make one radiator have a substantially infinite input impedance when the other radiator is energized and vice versa. Under these conditions the inactive antenna does not absorb radiated energy. The devices in Figs. 12–14 may be interchangeably used for either reception or radiation by reason of the reciprocity theorem.

As mentioned with reference to Fig. 1 any type of radiator capable of producing a suitable fan-shaped beam may be employed. The above-cited application Serial No. 344,633 discloses radiating electromagnetic wave guides which may be used in place of the cylindrical parabolic reflectors of Figs. 12 to 14.

Fig. 15 illustrates an alternate arrangement of Fig. 12 in part. A rotatable pedestal 200 supports a yoke 201 which has a frame 202 swung between the arms of the yoke on trunnions. The right trunnion 203 passes through the yoke arm and forms the shaft of a gear 204 which is engaged to the driving pinion 206 of a motor 207. On the frame 202 are mounted three hollow wave guide radiators 208, 209, and 210 that replace reflectors 182, 183 and 184, respectively, of Fig. 12. These guides, fully discussed in the above-mentioned application Serial No. 344,633, especially in Fig. 10 thereof, are constructed with two branches disposed at an angle with respect to each other of rectangular cross-section and of a length great compared to the other dimensions. The guides have narrow longitudinal slots on the opposed faces of the branches. Electromagnetic waves may be propagated from a radiator placed at the common junction or apex of the branches outwardly along their length at a phase velocity dependent on the cross-sectional area for a given frequency. The radiation escapes through the slots and substantially none reaches the end of the guides which may be left open. The direction of propagation of the radiated waves in free space forms an angle with their direction in the hollow wave guide whose cosine is the ratio of the phase velocity of the waves in free space to that of the phase velocity of the waves in said guide. Thus, at a particular frequency the two branches of a guide may be angularly adjusted to have a common direction of propagation of free space radiation along the bisector of the angle between the branches. Under these conditions there is obtained the fan-shaped beam desired. The wave guide 208 has an antenna situated at the junction of the branches and produces a beam similar to that obtained from reflector 182 and its antenna 12 in Fig. 12.

Fig. 16 reveals a possible arrangement inside wave guides 209 and 210. Radiators 215 and 216 are mounted in wave guide branches 217 and 218, respectively, equi-distant from the common junction or origin of the guide. Slots 219 and 220 enable the radiators to be adjusted to a distance, preferably, one-eighth wave length from the origin. This structure is a development of Fig. 4 in the co-pending application Serial No. 367,196, now Patent No. 2,402,622, granted June 25, 1946, for Radiating Electromagnetic Wave Guides filed November 26, 1940, in the name of William W. Hansen, one of the present inventors.

In operation, the radiators, 215 and 216, are arranged to be commutated by the device of Figs. 4–8. Electromagnetic energy from the energized antenna reaches the inactive antenna after travelling one-quarter wavelength, resulting in a phase delay of $$\frac{\pi}{2}$$

radians. Except over the short distance between 215 and 216, all points in the branch containing the inactive antenna have $$\frac{\pi}{2}$$

phase delay relative to the corresponding parts in the other wave guide branch. This method of operation results in a modified fan beam whose direction of maximum gain is shifted slightly from the bisector of the angle between the branches. Fig. 6 of the cited application Serial No. 367,196, now Patent No. 2,402,622 granted June 25, 1946 illustrates that the change in gain is more abrupt on the side of the spatial pattern next to the bisector and less abrupt on the far side than in the case of an antenna placed at the wave guide origin. The oscillating beam required for the systems of Figs. 1 and 2 may be produced by commutating the antenna coaxial line inputs. The wave guides of Fig. 15 may be interchangeably employed for transmission or reception in a similar manner as the devices of Figs. 12–14.

Figs. 17–21 illustrate a method of obtaining the necessary oscillating beam without resorting to the commutator of Figs. 4–8. Referring to Fig. 17, a radiator 225 is located at the junction of wave guide branches 226 and 227 shown in longitudinal section. Flat conducting rods 228 and 229, extending the length of the branches, are equipped with trunnions on their ends to permit free rotation in supports 230 and 231, respectively. Figs. 18 and 19 show in section the positions of rods 228 and 229, respectively. A drive shaft 232, seen in section, impels a driver 233 of a Geneva movement which is engaged to a driven wheel 234. A shaft 236, seen in section, connects the wheel 234 to a bevel gear 237 as well as extending beyond the plane of the paper to actuate a second wave guide for the other space coordinate. The gear 237 meshes with a gear 238 on a shaft 239. The rod 229 is driven by the shaft 239 through bevel gears 243 while the rod 228 is driven by this shaft through gears 242, 244, and 245 on shafts 240 and 241.

In operation the rods 228 and 229 intermittently and alternately occupy the positions in the wave guides shown in Figs. 18 and 19. Altering the position modifies the effective cross-section which results in a change of the phase velocity of propagation within the guide branches. Since the phase velocity of propagation in free space is constant, the direction of free space propagation must shift according to the cosine law mentioned above relating phase velocities and directions of propagation within and without the radiating guide. The rods in Fig. 17 may be driven smoothly without the use of the Geneva movement. In this case the mechanical simplification may compensate for reduced electrical sensitivity. An alternate type of rod is shown in Figs. 20 and 21 corresponding to Figs. 18 and 19. Conducting rods 250 and 251, half round in section, alternately fit into cavities of wave guides 252 and 259, respectively. Here the cross-sectional area of the guide is actually reduced, whereas in Figs. 18 and 19 while the effect is the same it is due to field distortion.

Fig. 22 illustrates a modification of the present invention wherein the frequencies received by the intermediate frequency amplifiers are substantially independent of the variation of the transmitted carrier frequency but are determined by crystal controlled oscillators of the same order of magnitude as the frequency pass bands of the intermediate frequency amplifiers. An oscillator 260, powered by a battery 261, generates a carrier frequency $f_1$ of, say, 3,000 mc. A coaxial line 262 interconnects the second resonator of the oscillator 260 and the first resonator of a power amplifier 263 which in turn supplies its output through a concentric cable to a radiator 264. A battery 265 accelerates the electron beam of the amplifier 263. The oscillator 260 is furnished with a buffer stage or third resonator which connects through a line 266 to a modulator tube 267. This buffer stage prevents appreciable reaction of the modulator upon the oscillator frequency. The modulator 267 has a crystal controlled oscillator 268 of, say, 15 mc. in series with its accelerating battery 269. The output resonator is tuned to the second upper sideband, $f_1+30$ mc., created by the modulation of 15 mc. on $f_1$, and feeds through a coaxial line 270 to a filter 271 also tuned to $f_1+30$ mc. This filter, introduced to suppress the other modulation products, may be a tuned amplifier or merely a single high efficiency resonator which supplies a pure $f_1+30$ mc. by a cable 272 to a crystal mixer 273. Also entering the mixer 273 is the received energy from antenna 274 including a leakage signal $f_1$ from radiator 264 and a returned signal $f_1 \pm Df$ from an approaching or receding target. Of the difference frequencies created by the mixer 273, the important ones, consisting of a strong one at 30 mc. and a weaker one at 30 mc.$\pm Df$, are selected by an I. F. amplifier 276. After amplification by amplifier 276 the 30 mc. frequency and its associated Doppler frequency are introduced into a mixer 277. A heterodyning frequency of 30 mc.$+$.455 mc., created by the interaction of the second harmonic of 15 mc. from the modulation oscillator 268 and a frequency of .455 mc. from another crystal controlled oscillator 278 in a mixer 279, is supplied to the mixer 277. The output of the mixer 277 is a second I. F. band at .455 mc., a frequency low enough to afford adequate selectivity in a connected amplifier 280. The second I. F. selective amplifier 280 feeds a mixer 281 where the incoming carrier is further reduced to 11 kc. by beating with the input from a local crystal oscillator 282 generating .444 or .466 mc. The output of the mixer 281 is 11 kc. and 11 kc.$\pm$the Doppler-shift frequency. The sign is positive for approaching and negative for receding targets and the shift varies from zero to perhaps 5,000 cycles per second. Two amplifiers 283 and 284 are connected to the output of the mixer 281, the former having a band width from 6 to 11 kc. and the latter having a band width from 11 to 16 kc. The amplifiers 283 and 284 have a sharp cut off at 11 kc. to filter out the carrier. A double-pole double-throw switch 286 connects either amplifier 284 or 283 to a detector circuit 287 according to whether it is desired to detect approaching or receding targets. An oscillator 288 may be used to supply a controllable amount of 11 kc. voltage to replace the carrier if the latter is completely suppressed. A volume indicator 289 is connected to the detector 287 output.

Fig. 22 illustrates a simple detecting system suitable for directing searchlights and similar uses, but it is understood that the principles may be incorporated into the distance measuring and follow-up systems of Figs. 1 and 2. It will be noted that the 30 mc. carrier in the I. F. amplifier 276 depends for stability only on the crystal oscillator 268, while the .455 mc. carrier in the second selective I. F. amplifier 280 depends for stability only on the crystal oscillator 278. The 11 kc. carrier output from mixer 281 is extremely stable because it is determined by crystal oscillators 278 and 282 and therefore may be sharply discriminated against or eliminated by the amplifiers 283 and 284 without appreciably attenuating the nearby Doppler-shift frequencies. This may be advantageous since the carrier is commonly so very much larger than the returned signal from the target that little amplification can be used without causing the carrier to overload the detector. At this maximum output, the audio or Doppler-shift frequency output is usually quite small necessitating additional audio amplification. Another way to visualize this is to point out that a large carrier and a small Doppler-shift frequency correspond to a very low per cent modulation; consequently the audio output is low even if the detector is run at high levels. If the oscillator 288 is employed, the percentage of modulation in the detector 287 may be made any value desired and much audio amplification eliminated.

Certain features of the present disclosure are claimed in divisional or continuation cases, such as application Serial No. 485,554, filed May 1, 1943, for Antenna systems, application Serial No. 499,562, filed August 21, 1943, for Klystron apparatus, application Serial No. 503,759, filed September 25, 1943, which is now Patent No. 2,414,100, granted January 14, 1947, for Automatic frequency control circuits, and application Serial No. 664,764, filed April 25, 1946, for Ultra high frequency antenna apparatus.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for determining the positional data of remote objects having relative motion with respect to said apparatus comprising, means for generating electromagnetic energy of a plurality of ultra high frequencies, means for radiating said energy into space, means for receiving a portion of said energy after reflection from a remote object, said receiver means including mixer means for comparing the radiated energy with the reflected energy as to frequency, said comparison producing beat notes proportional to said relative motion, an oscillator of adjustable frequency, balanced means connected to said oscillator and mixer means for modulating said beat notes with the adjustable frequency from said oscillator, narrow band pass filter means for passing corresponding sidebands of said modulating means output, and indicator means connected to said filter means for comparing the phases of said sidebands.

2. In an object detecting and locating system, directive radiator means adapted to project electromagnetic energy at an object, receiver means having partially overlapping lobes of reception, said receiver means serving to receive some energy directly from said radiator means and some as reflected from the object and serving to detect any difference frequency, and servo means responsive to said difference frequency for orientating said receiver means to maintain a detected object substantially on the bisector of the angle extending between the axes of symmetry of said lobes of reception.

3. In an object detecting and locating system, radiator means adapted to project partially overlapping lobes of electromagnetic radiation into space, receiver means for receiving a portion of said radiation directly and another portion as reflected from a relatively movable object, said receiver means combining said directly received radiation and said reflected radiation to produce a beat note, and servo means responsive to said beat note for orientating said radiator means to maintain a detected object substantially on the bisector of the angle extending between the axes of symmetry of said lobes of radiation.

4. In an object detecting and locating system, means for generating ultra high frequency electromagnetic energy, directive means for radiating said energy into space, receiver means having partially overlapping lobes of reception for receiving a portion of said energy after reflection from an object, mixer means, switching means alternately supplying the energy in said lobes of reception to said mixer means, said mixer means serving to compare the frequencies of the radiated and received energies, detector means for demodulating the beat frequencies produced in said mixer, generator means rotated synchronously with said switching means for producing a reference voltage, means for comparing the output voltage of said detector means and said reference voltage as to phase and magnitude, motor means for orientating said radiating means and receiver means, and control means for said motor means for maintaining the detected object substantially on the bisector of the angle extending between the axes of symmetry of said lobes of reception.

5. In an object detecting and locating system, directive means for radiating electromagnetic energy into space, directive receiver means for receiving a portion of said radiated energy after reflection from a remote object, mixer means, switching means alternately supplying different portions of the received energy to said mixer means, said mixer means serving to compare the frequencies of the radiated and received energies, detector means for demodulating the frequencies produced in said mixer, means rotating synchronously with said switching means for supplying a reference voltage, means for comparing the output voltage of said detector means with said reference voltage as to phase, and servomotor means for orientating said receiver means, said servomotor means being controlled from said phase comparing means.

6. In a system for determining the positional data of remote objects having relative motion with respect to said system, means for generating overlapping beams of fixed ultra high frequency electromagnetic energy, radiator means for projecting said fixed frequency energy into space, oscillator means for generating an intermediate frequency, means for modulating the ultra high frequency by the intermediate frequency, filter means isolating a sideband produced by said modulating means, means for receiving a portion of the energy projected into space after reflection by a remote object, and mixer means supplied by said receiving means and said filter means, said mixer means producing an intermediate frequency substantially independent of variation in said ultra high frequency.

7. In an object detecting and locating system, means for generating ultra high frequency electromagnetic energy, means for radiating said energy into space, means for receiving a portion of said energy after reflection from an object, mixer means for comparing the frequencies of the radiated energy with the energy reflected from said object, said comparison producing beat notes proportional to the relative motion of said object and said locating system, a phase-shift oscillator of adjustable frequency having electron tubes associated with its frequency determining networks, balanced modulator means connected to said mixer and oscillator means for mixing said beat notes with the adjustable frequency from said phase-shift oscillator, narrow band pass filter means for passing corresponding sidebands of said modulator means output, frequency discriminator means tuned to the center of the narrow band of said filter means for producing a control voltage proportional to the sense and amount of deviation from the center frequency, said control voltage supplying a bias to the grids of the electron tubes in the frequency determining networks of said phase-shift oscillator, said bias determining the plate resistance of said tubes and so modifying the networks that said oscillator compensates for frequency changes in the beat notes to maintain the sidebands of said modulator means output substantially constant.

8. In an object detecting and locating system, means for generating ultra high frequency electromagnetic energy, means for radiating said energy into space, means for receiving a portion of said energy after reflection from an object, mixer means for comparing the frequencies of the radiated and reflected energies, said comparison producing beat notes proportional to the relative motion of the object and said detecting and locating system, oscillator means of adjustable frequency, balanced modulator means connected to said mixer and oscillator means for mixing said beat notes with said adjustable frequency, narrow band pass filter means for passing a single sideband of said modulator means output, frequency discriminator means fed by said filter means, and follow-up means controlled by said discriminator means for tracking the adjustable frequency of said oscillator with said beat notes to maintain the sideband of said modulator means output substantially constant.

9. In apparatus of the character described, directive receiver means for receiving continuous wave ultra high frequency energy, said receiver means having partially overlapping zones of reception, means for alternately varying the pick-up sensitivity of said receiver means so that the latter is alternately more sensitive to energy originating in one zone and then more sensitive to energy originating in the other zone, detector means fed by said receiver means for detecting amplitude difference between the energies of the respective zones, generating means operable in synchronism with said pick-up varying means for supplying a reference voltage, and means connected to said detector and generating means for comparing as to phase said reference voltage with the voltage produced by said amplitude difference.

10. In apparatus of the character described, directive radiator means for radiating continuous wave ultra high frequency energy, said radiator means having partially overlapping zones of radiation, means for alternately varying the directivity of said radiator means so that the latter alternately radiates more in one zone and then radiates more in the other zone, means for receiving a portion of said radiation after reflection from a remote object and connected detector means for detecting amplitude variation of the received radiation as the directivity of the radiator means is varied, generating means operable in synchronism with said directivity varying means for supplying a reference voltage, and means connected to said detector and generating means for comparing as to phase said reference voltage with the voltage produced by said amplitude variation.

11. In apparatus of the character described, directive receiver means for receiving continuous wave ultra high frequency energy, said receiver means having a periodically shifting zone of reception so that it is periodically more sensitive to energy originating in one direction and then more sensitive to energy originating in another direction, detector means fed by said receiver means for detecting amplitude difference between the energies originating in different directions, generating means operable in synchronism with the shifting of said zone of reception for supplying a reference voltage, and means connected to said detector and generating means for comparing as to phase said reference voltage with the voltage produced by said amplitude difference.

12. In an object detecting and locating system, means for generating electromagnetic energy, means for radiating the energy into space, antenna means for receiving some of said energy radiated directly to said antenna means and also some of said energy as reflected from an object, mixer means supplied by said antenna means for comparing the frequencies of the radiated and reflected energy to produce a Doppler beat note, energy control means for amplitude modulating the energy supplied by said antenna means to said mixer means by causing the energy received from one direction alternately to increase and decrease and conversely and simultaneously causing the energy from another direction alternately to decrease and increase, detector means for demodulating said beat note, means synchronized with said energy control means for producing a reference wave, and means for comparing the output of said detector means with the reference wave to obtain directional information.

WILLIAM W. HANSEN.
RUSSELL H. VARIAN.

REFERENCES CITED

The following references are of record in the file of this patent:

UNITED STATES PATENTS

| Number | Name | Date |
|---|---|---|
| 1,450,966 | Affel | Apr. 10, 1923 |
| 1,467,154 | Hammond | Sept. 4, 1923 |
| 1,876,746 | Purington | Sept. 13, 1932 |
| 2,155,208 | Travis | Apr. 18, 1939 |
| 2,176,469 | Moueix | Oct. 17, 1939 |
| 2,183,399 | Heising | Dec. 12, 1939 |
| 2,189,549 | Hershberger | Feb. 6, 1940 |
| 2,187,618 | Gerhard | Jan. 16, 1940 |
| 2,193,361 | Rice | Mar. 12, 1940 |
| 2,231,929 | Lyman | Feb. 18, 1941 |
| 2,236,893 | Chaffee | Apr. 1, 1941 |
| 2,253,501 | Barrow | Aug. 26, 1941 |
| 2,273,447 | Ohl | Feb. 17, 1942 |
| 2,409,448 | Rost | Oct. 15, 1946 |

---

Certificate of Correction

Patent No. 2,468,751      May 3, 1949

WILLIAM W. HANSEN ET AL.

It is hereby certified that error appears in the printed specification of the above numbered patent requiring correction as follows:

Column 10, line 21, after the word "band" insert *filters*;

and that the said Letters Patent should be read with this correction therein that the same may conform to the record of the case in the Patent Office.

Signed and sealed this 2nd day of May, A. D. 1950.

[SEAL]

THOMAS F. MURPHY,
*Assistant Commissioner of Patents.*